United States Patent [19]

Long et al.

[11] Patent Number: 4,463,813

[45] Date of Patent: Aug. 7, 1984

[54] SPRING MOUNTED STANDARD ASSEMBLY

[75] Inventors: John D. Long; Phillip E. Stevens, both of Ankeny, Iowa

[73] Assignee: Deere & Company, Moline, Ill.

[21] Appl. No.: 326,735

[22] Filed: Dec. 2, 1981

[51] Int. Cl.³ .................. A01B 61/04; A01B 35/24
[52] U.S. Cl. .................................................. 172/705
[58] Field of Search ............... 172/705, 707, 708, 710, 172/264, 265, 266

[56] References Cited

U.S. PATENT DOCUMENTS

| 2,338,374 | 1/1944 | Baldwin | 172/705 |
|---|---|---|---|
| 2,850,956 | 9/1958 | Rogers | 172/705 |
| 2,906,353 | 9/1959 | Rogers | 172/265 |
| 3,258,076 | 6/1966 | Groenke | 172/705 |
| 3,486,566 | 12/1969 | Nja | 172/705 X |
| 3,493,055 | 2/1970 | Van Peurem | 172/705 |
| 3,700,039 | 10/1972 | Essex | 172/265 |
| 4,078,615 | 3/1978 | Kelly | 172/705 |

FOREIGN PATENT DOCUMENTS

| 19513 | 4/1929 | Australia | 172/705 |
|---|---|---|---|
| 635406 | 1/1962 | Canada | 172/264 |
| 1390347 | 1/1965 | France | 172/705 |

OTHER PUBLICATIONS

Kverneland Chisel Plough, 711458 10.000-5-79.
Kvernelands Plows Brochure MK Jaeren 712359 50.000.1.74.
Dakon Automatic Reset Deep Till/Chisel Plow Brochure.

Primary Examiner—Richard J. Johnson

[57] ABSTRACT

A spring trip standard assembly for a chisel plow or the like, the standard assembly having a compact single coil spring structure with a trip geometry producing a high initial trip force and a reduced maximum to initial trip force ratio. The horizontal trip force remains above the initial trip force through greater than half the trip height and then the trip force decreases. By reduction of the ratio of maximum to initial trip force, a heavy duty standard assembly is provided which may be used on lightweight tool frames originally designed for high trip force ratio standards having lower initial spring trip forces.

22 Claims, 12 Drawing Figures

SPRING MOUNTED STANDARD ASSEMBLY

BACKGROUND OF THE INVENTION

The present invention relates generally to tillage implements and more specifically to a heavy duty spring trip standard assembly.

Spring trip standard assemblies, particularly chisel plow standard assemblies, typically are designed to have large increases in trip force as the shank trips upwardly and rearwardly to clear an obstacle. The force at maximum trip height is typically three to five times the initial trip force. This large increase in trip force requires a very strong and heavy frame to carry the maximum trip force developed by the standard. To lower the maximum trip force of a conventional spring trip standard assembly requires lowering the initial trip force. However, a low initial trip force decreases implement stability and results in unwanted tripping of the standard. High initial trip forces are required with tillage implements which are towed by high horsepower tractors in order to maintain deep penetration of the earthworking tool, particularly at relatively high ground speeds since draft increases with ground speed.

Although spring trip standard assemblies utilizing a leaf-spring structure have been available, such structure has required a longer than normal horizontal portion on the shank and a relatively tall rear bracket extending upwardly from the rear of the shank to accommodate the leaf spring and provide the geometry necessary for a trip force which is initially high and which decreases as the tool is pushed higher. An example of such structure may be found in the automatic reset system on the commercially available Kvernelands plows and chisel plows produced by Kvernelands Fabrikk A/S of Kverneland, Norway. Other standard assemblies, such as shown in U.S. Pat. No. 2,906,353 issued to I. C. Rogers, utilize a pair of telescoping spring-strut units to provide relatively high initial trip force. The telescoping units are expensive and are subject to binding.

Some spring trip standard assemblies, such as the aforementioned Kverneland and Rogers assemblies, require down-stops to establish the working depth of the shank and have brackets which are constantly loaded by the spring. Therefore, the support structure must be strong enough to accommodate the constant spring load. The spring load must be removed to disassemble the structure.

SUMMARY OF THE INVENTION

It is therefore an object of the present invention to provide an improved spring trip standard assembly having a high initial trip force.

It is also an object of the present invention to provide an improved spring trip standard assembly capable of deep soil penetration at relatively high ground speeds.

It is a further object of the invention to provide a spring trip standard assembly having a high initial trip force with a reduced maximum to initial trip force ratio. It is another object to provide such a standard assembly which is compact in size and neat in appearance and which is relatively inexpensive to manufacture.

It is yet another object of the invention to provide a spring trip standard assembly which permits use of a lighter weight frame than is typically possible with conventional assemblies with comparable initial trip forces.

It is a further object of the present invention to provide a compact, relatively light-weight spring trip standard assembly which does not require a shank having an expensive horizontal portion or a relatively tall spring bracket. It is another object to provide such a standard which utilizes only a single relatively short coil spring and yet achieves a low maximum to initial trip force ratio with trip force actually decreasing as the standard is raised beyond a preselected position. It is a further object to provide a spring trip standard assembly having a self-contained spring to reduce loading and facilitate assembly and disassembly of the unit.

It is still a further object of the invention to provide an improved spring trip standard assembly having an advantageous trip curve with a high initial trip force, wherein the trip curve provides both sufficient momentum for positive resetting and adequate decrease in load above a preselected trip location for safely clearing obstacles.

In accordance with the above objects a spring trip standard assembly is provided having a mounting bracket which includes a lower pivot and which extends upwardly and rearwardly from the lower pivot to an upper pivot. A shank is pivotally connected at its forward end to the lower pivot and extends rearwardly and slightly downwardly to a bend location from which the shank curves downwardly and somewhat forwardly to a connecting point for attaching the earthworking tool. Vertical mounting plates extend upwardly from the bend location and pivotally carry a spring-containing bracket which extends rearwardly of the vertical plates. A coil spring is contained between the rear of the spring-containing bracket and a spring abutting surface on a casting extending through the spring. The casting is supported between the upper pivot of the mounting bracket and receives a bolt which extends through an aperture in the rear of the spring-containing bracket.

The geometry of the standard produces a high initial horizontal trip force. The horizontal trip force increases to a maximum of about 1.5 times the initial force at about half the trip height before decreasing toward the initial trip force level at about 75% of the trip height. A stop on the casting limits the trip height to about 75% of the maximum permissable.

The assembly is relatively compact and economical to manufacture. The high trip force produces improved chisel plow function and stability even during deep soil penetration at relatively high ground speeds, and reduction of the ratio of maximum to initial trip force permits lighter weight frames and standards to be used for a given trip force. Double coil springs and leaf springs are eliminated. The single coil spring is contained by the casting and bracket so that a separate down stop is not required and so that spring loading does not produce added stresses or hinder assembly and disassembly of the structure.

These and other objects, features and advantages will become apparent from reading the detailed description below and viewing the accompanying drawings.

DESCRIPTION OF THE PREFERRED EMBODIMENT

Figure 1:
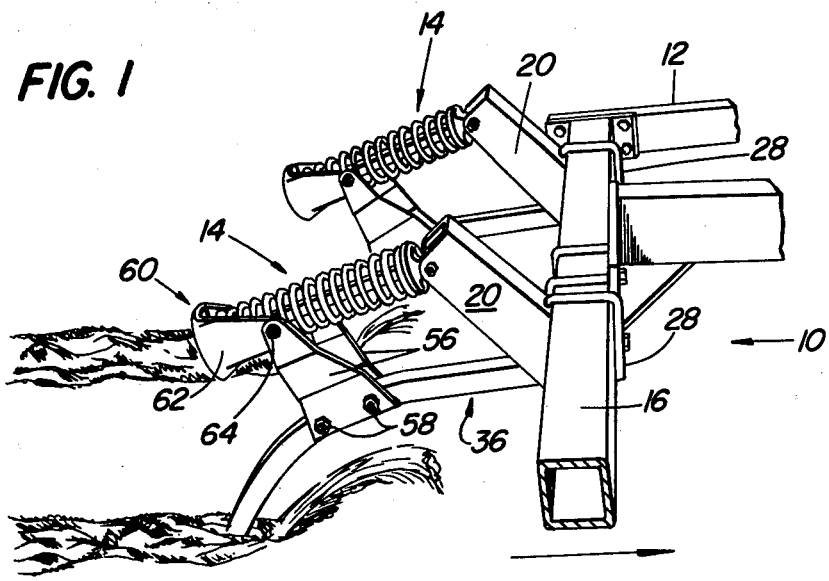
FIG. 1 is a perspective view of a tool frame supporting the spring trip standard assembly of the present invention.

Referring to FIG. 1, therein is shown a portion of an implement 10 with a frame 12 adapted to be towed forwardly over the ground by a tractor or other towing vehicle. Preferably the implement 10 is a chisel plow or mulch tiller or the like, and has a plurality of spring trip standard assemblies 14 spaced transversely on one or more tool-supporting elements 16 which form part of the frame 12. The standard assemblies 14 carry earth-working tools 18 (FIG. 2) such as twisted shovels, or other tools, which are subjected to heavy loading as they are pulled through the soil. Commonly, the tools 18 are required to deeply penetrate heavy soil and therefore are subjected to large draft forces F, particularly when high horsepower tractors are utilized to pull the implement 10 at relatively high speeds.

Figure 2:
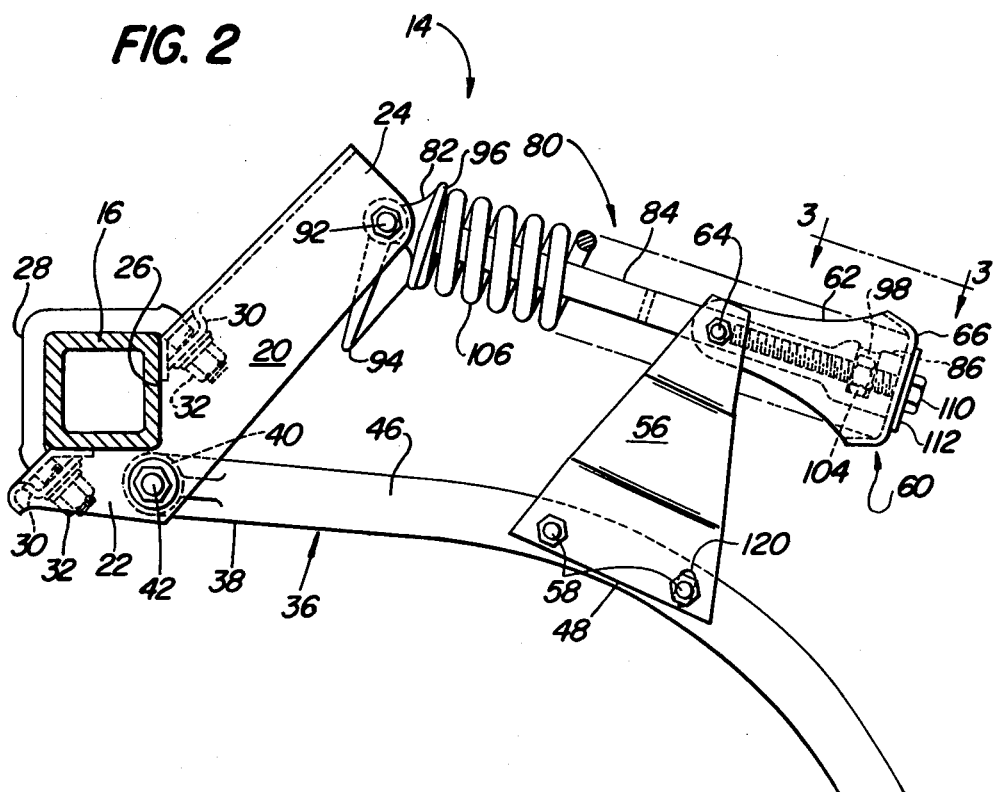
FIG. 2 is a side elevation of the standard assembly of the present invention.

As best seen in FIGS. 1 and 2, the spring trip standard assembly 14 includes a main bracket 20 which is generally channel-shaped and has a lower end 22 and an upper end 24. The lower forward portion of the bracket 20 includes a right-angle notch 26. In the preferred embodiment, the support element 16 is a square tubular beam, and the notch 26 is positioned against the rear and bottom faces of the beam 16. A U-bolt 28 extends around the forward and upper surfaces of the beam 16 and is received into a pair of bolt-receiving locations 30. Nuts 32 are tightened against the bracket 20 to maintain the bracket tightly against the bottom and rear surfaces of the supporting beam 16.

A shank 36 includes a forward end 38 having an integral pivot-receiving eye member 40 which is received between the sides of the channel-shaped main bracket 20. A transversely-extending pivot pin 42 extends through the eye and through holes in the sides of the main bracket 20 to pivotally connect the shank 36 to the bracket 20 for rocking generally in a vertical plane about a transverse pivotal axis. In the preferred embodiment, the pivotal axis is located directly below the lower rear corner of the supporting element 16 at the lower end of the the main bracket 20.

The shank 36 includes a substantially horizontal portion 46 extending rearwardly from the forward end 38 to an intermediate portion 48 which curves downwardly and generally rearwardly to a lower tool-receiving end 50 substantially rearwardly of and below the pivotal connection of the shank 36 to the bracket 20.

The tool 18 is connected to the end 50 by a pair of bolts 52.

Figure 9:
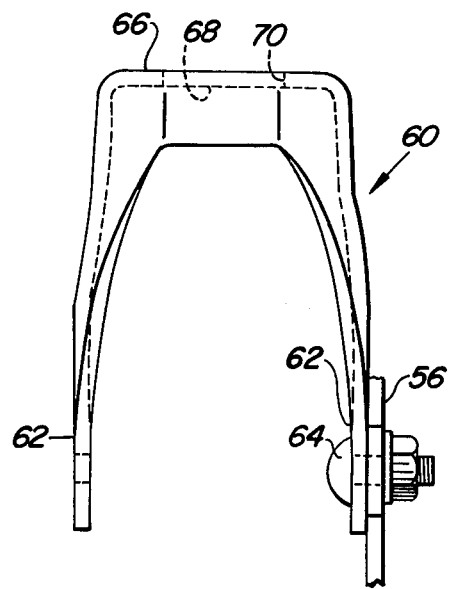
FIG. 9 is a top view of the spring bracket of FIG. 8.
Figure 8:
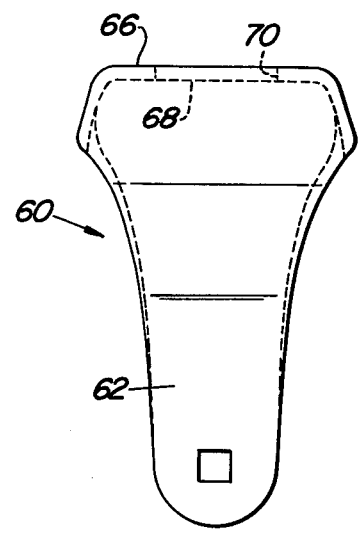
FIG. 8 is a side view of the spring bracket.

A pair of side plates 56 are connected by bolts 58 to opposite sides of the shank 36 adjacent the intermediate portion 48. The plates extend upwardly from the intermediate portion 48 and diverge outwardly from the sides of the shank 36. A generally U-shaped or saddle-shaped bracket 60 is rockably supported between the spaced-apart upper ends of the side plates 56. As best seen in FIGS. 2 and 8-10, the spring bracket 60 includes a pair of sidelegs 62 pivotally connected at their forward ends to the side plates 56 by a pair of bolt and bushing assemblies 64, only one of which is shown in FIG. 9. The sidelegs 62 extend rearwardly to a generally circularly-shaped bight portion 66 having a forwardly-facing, spring-abutting surface 68 and a circular aperture 70.

Spring support or retaining structure 80 includes a forward end 82 pivotally connected to the upper end 24 of the main bracket 20. A rod-like portion 84 extends rearwardly from the forward end to a bolt-receiving end 86 which terminates adjacent the bight portion 66 of the spring bracket 60 when the shank is in the soil-working position (FIG. 2). A transverse aperture 90 extends through the forward end. A pivot pin 92 extends through the aperture 90 and through holes in the sides of the main bracket 20 at the upper end 24 for permitting the structure 80 to rock up and down about a transverse horizontal pivot located rearwardly of and above the pin 42 and forwardly of the pivots 64. A stop member 94 formed integrally with the forward end 82 extends downwardly from the pin 92 generally at a right angle to the axis of the portion 84. The forward end 82 includes a rearwardly-facing, spring-abutting surface 96. Preferably the spring support or retaining structure 80 is a unitary cast structure.

Figure 3:
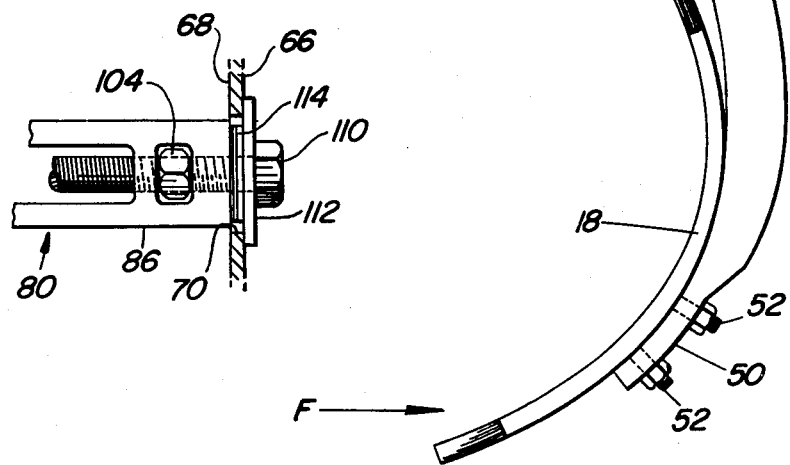
FIG. 3 is a view taken substantially along lines 3—3 of FIG. 2 but showing alternative means for adjusting the assembly.
Figure 4:
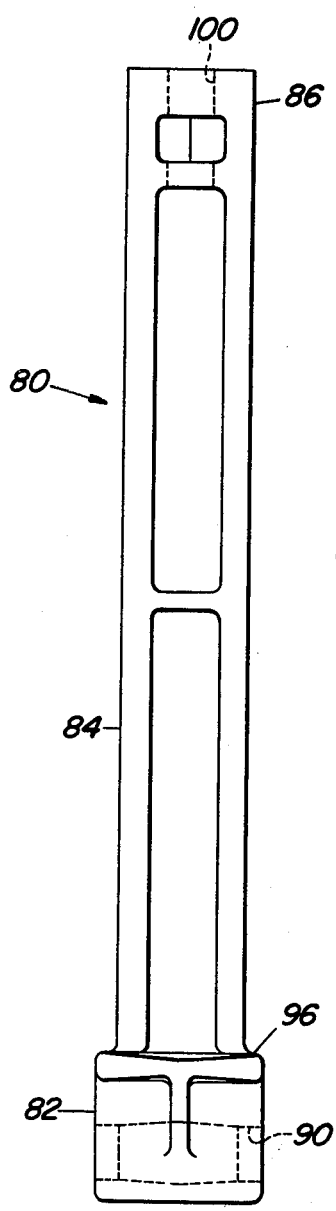
FIG. 4 is a top view of the cast spring support for the assembly shown in FIG. 2.
Figure 6:
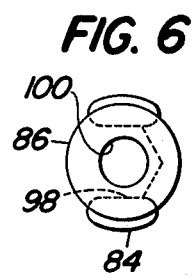
FIG. 6 is a view taken along lines 6—6 of FIG. 5.
Figure 5:
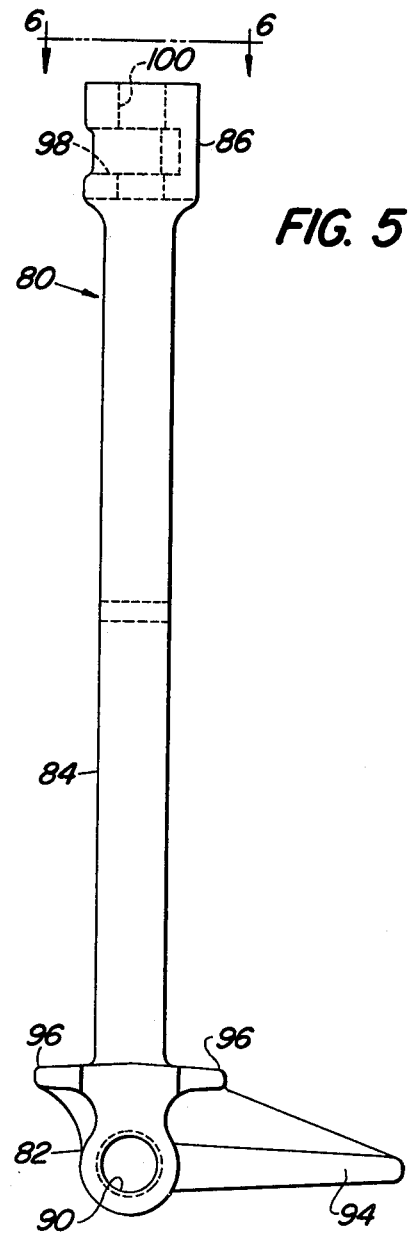
FIG. 5 is a side view of the support shown in FIG. 4.
Figure 7:
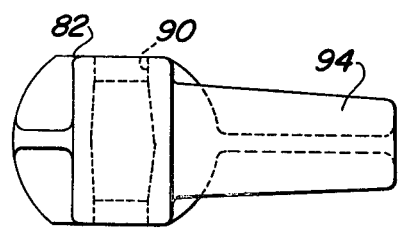
FIG. 7 is an end view of the forward end of the support shown in FIG. 5.
Figure 10:
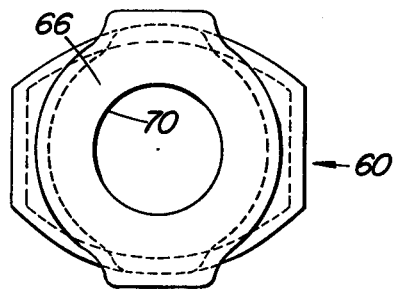
FIG. 10 is an end view of the bracket of FIG. 9.

A nut-receiving cavity 98 is formed in the bolt-receiving end 86 and intercepts an axially inwardly-extending aperture 100. A nut 104 is inserted in the cavity 98 where it is restrained against rotation relative to the structure 80 by flats located at the sidewalls of the cavity. A coil spring 106 is inserted over the end 86 of the retaining structure 80 and is positioned against the rearwardly-facing, spring-abutting surface 96 at the forward end 82 (FIG. 2). The forwardly-facing, spring-abutting surface 68 of the bight portion 66 of the spring bracket 60 is positioned against the opposite end of the spring 106. A bolt 110 is inserted through the apertures 70 and 100 and is threaded through the nut 104. A washer 112 positioned adjacent the head of the bolt 110 acts against the bight portion 66 as the bolt is tightened to cause the spring bracket 60 to compress the spring 106. In one embodiment, washers 114 (FIG. 3) can be added or removed as necessary between the end 86 and the washer 112 to adjust the depth of the tool-receiving end 50. In the final assembled structure as shown in FIG. 2, the retaining structure 80 acts as a tension link to maintain the coil spring 106 in a compressed state while at the same time preventing the shank 36 from pivoting downwardly beyond the soil-working position. The width of the rod-like portion 84 (FIG. 4) is substantially equal to but slightly less than the inner diameter of the coil spring 106. The portion 84 thus acts to prevent the coil spring 106 from buckling as it is compressed between the spring bracket 60 and the spring-abutting surface 96 of the forward end 82. The above-described construction permits easy assembly and disassembly of the unit 14. In the soil-working position shown in FIG. 2, the structure 80 acts as a tension link to contain the compressed spring 106 without transferring the load to the various support brackets or to the tool-supporting elements 16.

In the embodiment shown in FIG. 2, the rear aperture in each side plate 56 is vertically slotted at 120 so that the side plates can be adjusted to vary the location of the pivots 64 relative to the shank 36 to thereby change the depth of the tool-receiving end 50. When a slot 120 is utilized rather than the washers 114 of FIG. 3, a rear flange-head bolt 58 is torqued tightly against the plate.

Figure 12:
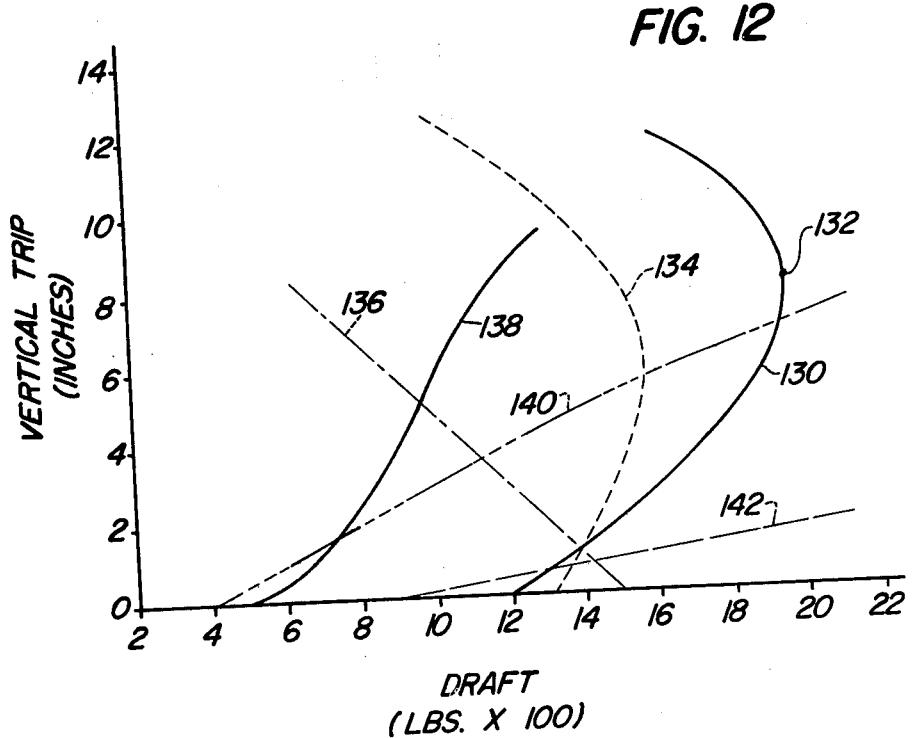
FIG. 12 is a graph of the trip force curve for the assembly shown in FIG. 2 as well as for numerous prior art assemblies.
Figure 11:
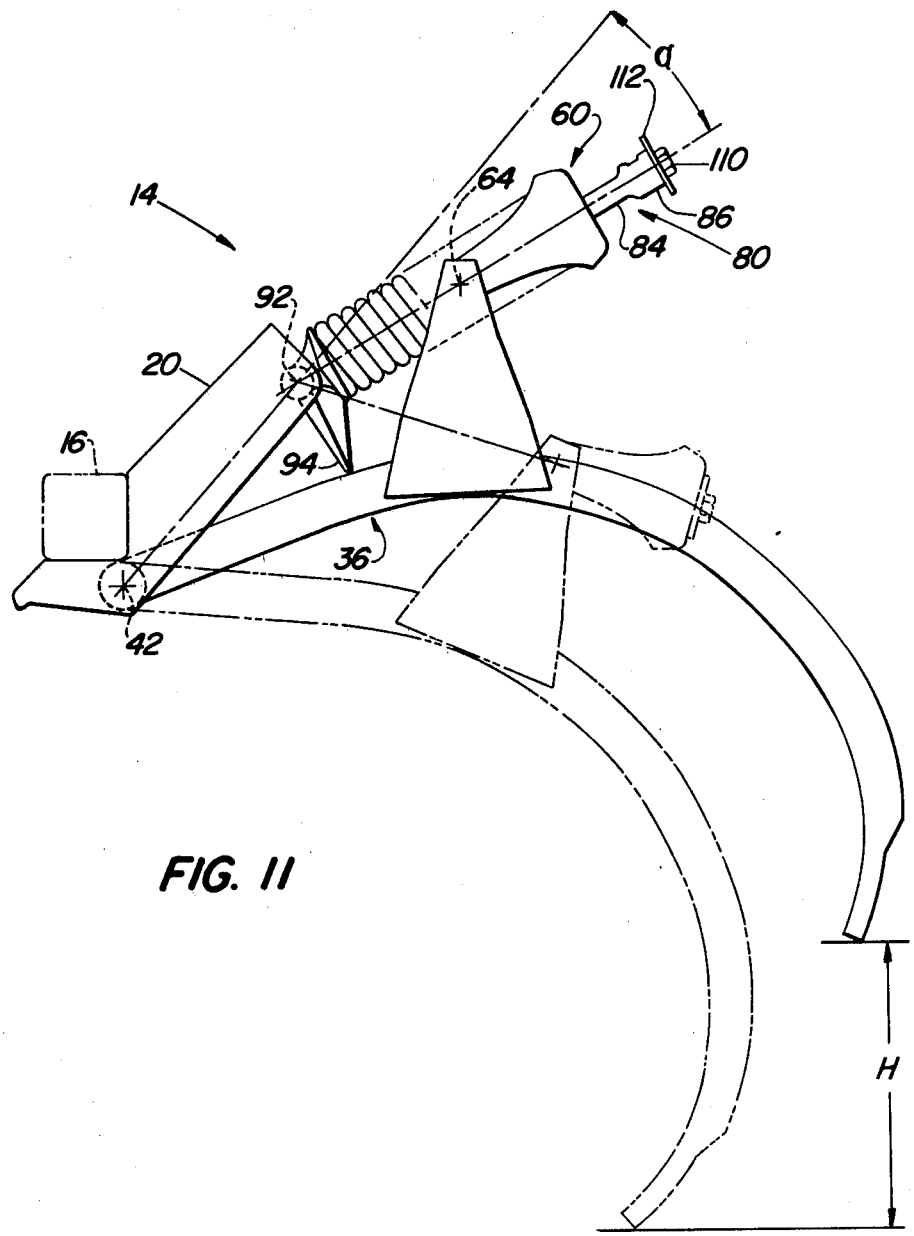
FIG. 11 is a schematic representation of the tripping action of the assembly shown in FIG. 2 with the solid lines depicting the shank in the tripped position, and the broken lines depicting the shank in the soil-working position.

Referring to FIG. 2, it is evident that as a horizontal load F acts against the tool-receiving end 50 of the shank 36, the shank will tend to pivot in the counterclockwise direction about the pin 42. However, such rocking of the shank 36 is opposed by the bias of the spring 106 acting against the spring bracket 60 to urge the side plates 56 and the shank 36 downwardly in the clockwise direction. When the horizontal load acting against the end 50 exceeds a preselected limit, the bias of the spring 106 will be overcome, and the spring bracket 60 will act against the spring to further compress it at which time the bight portion 66 will begin moving forwardly away from the washer 112 (FIG. 11). The arc described by the pivots 64 moves closer to the pin 92 as the shank is pivoted upwardly and thereby causes the spring bracket 60 to further compress the spring 106. As the shank 36 pivots upwardly from the soil-working position shown in FIG. 2, the moment arm through which the horizontal force F acts to pivot the shank in the counterclockwise direction, and the moment arm through which the force of the coil spring 106 acts to pivot the shank in the opposite direction, are both decreasing. Initially the moment arm through which the force F operates decreases at a faster rate than that of the moment arm through which the spring operates, and as the spring 106 is compressed the trip force level increases from an initial trip force level, which in the preferred embodiment is greater than eight hundred pounds and which preferably is approximately twelve hundred pounds. This is best illustrated by the curve 130 on the trip force graph of FIG. 12. At a tripped position between the soil-working position and a final tripped position, indicated generally at point 132 on the curve 130, the moment arm through which the spring 106 acts begins to decrease at a faster rate than the moment arm through which the force F operates and the trip force level begins to decrease.

As the shank 36 pivots upwardly (FIGS. 2 and 11), the retaining struture 80 also pivots upwardly about the pin 92 to move the stop member 94 rearwardly and upwardly from between the sides of the main bracket 20. Before the shank 36 trips upwardly to a position where the pins 42, 92, and 64 are in alignment, the stop member 94 protrudes out sufficiently to contact the upper portion of the shank 36 (FIG. 11). The stop member 94 prevents the shank from tripping to an over-center position from which it would not return automatically to the soil-working position of FIG. 2.

The spring bracket arrangement 60 provides for an ample length of coil spring 106 without requiring an expansive horizontal shank portion 46 or a relatively tall bracket connected to the intermediate portion 48 of the shank.

In the preferred embodiment when the shank is in the soil-working position, the spring 106 is compressed from its free length a distance approximately half the difference between the free length and the solid length.

At the maximum tripped position, the angle a (FIG. 11) is approximately 6–10 degrees, and the spring is fully compressed to its solid length.

In the preferred embodiment as shown in FIG. 2, which is drawn substantially to scale, the ratio of the maximum trip force to the initial trip force level is greater than about 1.4 to 1 but less than approximately 2 to 1. Preferably the initial trip force is approximately twelve hundred pounds and increases to a maximum level of approximately eighteen hundred pounds, which provides a ratio of approximately 1.5 to 1. Structure providing a lower ratio, characterized by the trip force curve 134 of FIG. 12 and typical of some commercially available plows utilizing leaf spring arrangements, does not provide as much positive momentum from the intermediate trip location, represented by the knee of the curve, to the soil-working position. The present invention also provides more positive resetting action than does, for example, an assembly characterized by a trip curve which immediately decreases from the initial trip force (curve 136 of FIG. 12). The present structure also provides a much higher initial trip force as well as a lower ratio than do prior art assemblies such as represented by curves 138, 140, and 142 of FIG. 12.

In operation, the implement 10 is pulled forwardly over the soil with the soil-working tools 18 penetrating deeply beneath the surface. The horizontal force F acting against the tool-receiving end 50 of the shank 36 during normal operation is substantial but is overcome by the bias of the spring 106 acting through the spring bracket 60 and side plates 56 to maintain the shank in the soil-working position. If the tool 18 hits an obstacle such as a rock or a stump, the force increases above the initial trip force level, and the shank begins to rock upwardly about the pin 42 to further compress the spring 106. The shank will trip upwardly a distance H (FIG. 11) sufficient to clear the obstacle. In the preferred embodiment the maximum distance H is approximately twelve inches, at which point the stop 94 contacts the shank 36 to prevent the shank from tripping to an over-center position. While the shank 36 is tripping upwardly, the spring bracket 60 slides over the retaining structure 80 to compress the spring between the spring-abutting surfaces 96 and 68. If the obstacle is large and the shank must trip up a distance H greater than approximately eight inches, the geometry of the standard assembly 14 provides a decrease in the trip force, as shown above the knee 132 in the trip force curve 130 of FIG. 12, so that the shank can trip more easily. Once the obstacle is cleared, the shank will automatically return to the soil-working position with the knee of the curve 130 providing sufficient momentum for positive reentry.

Having described the preferred embodiment, it will be apparent that modifications can be made without departing from the scope of the invention as defined in the accompanying claims.

We claim:

1. In a tillage implement having a frame adapted for forward movement over a field, a heavy duty spring trip shank assembly comprising: a mounting bracket adapted for connecting to the frame; a shank having a forward end and extending rearwardly from the forward end to an intermediate portion, said shank extending downwardly from the intermediate portion to a lower tool-receiving end; first pivot means connecting the forward end of the shank to the mounting bracket for permitting the shank to rock thereabout in generally a vertical plane between a lower soil-working position and an upper tripped position; support structure connected for rocking with the shank extending upwardly from the shank, said structure including a forwardly-directed, spring-abutting surface; spring-retaining means including a rearwardly-directed, spring-abutting surface, second pivot means connecting the spring-retaining means to the mounting bracket rearwardly of and above the first pivot means, wherein the distance between the spring-abutting surfaces decreases as the shank rocks upwardly from the soil-working position; a single coil spring compressed between the spring-abutting surfaces and biasing the shank to the soil-working position; wherein said coil spring acts through a first effective moment arm which decreases as the shank rocks upwardly from the soil-working position, and wherein rearward forces against the tool-receiving end act through a second effective moment arm to rock the shank against the bias of the coil spring, said second effective moment arm changing as the shank rocks, wherein said first and second moment arms and said coil spring cooperate to establish a trip force curve characterized by a high initial rearward trip force level whereat the shank begins to rock upwardly from the soil-working position, said trip force level increasing to a maximum level less than approximately twice said initial trip force level as the shank rocks upwardly to an intermediate position and thereafter decreasing as the shank rocks upwardly beyond the intermediate position to a maximum tripped position, wherein at the maximum tripped position of the shank the trip force level is about equal to said initial trip force level, wherein the spring-retaining means includes a rod-like member extending through the coil spring between said spring-abutting surfaces, and wherein said member includes means for preventing the spring from expanding to a non-compressed state and biasing the shank downwardly below the soil-working position, said means including a cavity located at one end of the member, a nut captively held in said cavity, and a bolt threaded into said nut and extending through one of the spring-abutting surfaces, said bolt having a length sufficient to permit lengthening of the spring-retaining means to the free length of the coil spring.

2. The invention as set forth in claim 1 wherein said initial trip force level is greater than one thousand pounds and said maximum level is less than two thousand pounds.

3. The invention as set forth in claim 14 or 2 wherein the ratio of said maximum level to said initial level is about 1.5 to 1.

4. The invention as set forth in claim 4 wherein the support structure includes an upright member fixed to the shank, a U-shaped member including sidelegs pivotally connected to and extending rearwardly from the upright member, wherein the forwardly-directed, spring-abutting surface defines the bight portion of the U-shaped member rearwardly of the pivotal connection of said member with said upright member so that at least one-third of the spring extends rearwardly of said pivotal connection when the shank is rocked to the maximum tripped position.

5. The invention as set forth in claim 1 wherein the spring-retaining means comprises a casting with integral stop means extending downwardly at substantially a right angle to the axis of the rod-like member for contacting the shank to prevent said shank from tripping beyond the maximum tripped position.

6. The invention as set forth in claim 4 wherein when the shank is in the soil-working position, the pivotal connection of the U-shaped member is located between a first horizontal plane passing through the first pivot means and a second horizontal plane passing through the second pivot means.

7. In a tillage implement having a frame with a transverse support element and adapted for forward movement over the ground, a heavy duty spring trip standard assembly comprising: a bracket connected to the support element and having a lower section extending below the support element and an upper section extending rearwardly and upwardly from the element; a shank having a forward end, a generally horizontal portion extending rearwardly from the forward end, and an intermediate portion curved downwardly from the horizontal portion and terminating in a lower tool-receiving end; means pivotally connecting the forward end of the shank to the lower bracket end for permitting the shank to rock about a first transverse pivotal axis between a lower soil-working position and an upward fully tripped position; an upright bracket member connected to the shank and extending above the intermediate portion; a U-shaped bracket having leg portions connected to the upright bracket member for rocking about a second transverse pivotal axis above the intermediate portion, said leg potions of the U-shaped member extending rearwardly from said second pivotal axis to a bight portion including a forwardly-facing, spring-abutting surface; spring-retaining structure including a rearwardly-facing, spring-abutting surface; means pivotally connecting said spring-retaining structure to the upper section for rocking about a third transverse pivotal axis located rearwardly of and above the first pivotal axis; a single coil spring compressed between the forwardly- and rearwardly-facing, spring-abutting surfaces for biasing the shank toward the soil-working position, wherein said spring-retaining structure includes tension means extending axially through the spring for retaining the spring in a compressed condition and preventing the shank from rocking below the soil-working position, and wherein the forwardly-facing, spring-abutting surface is located rearwardly of the third pivotal axis a distance of at least about one-third of the length of the spring in said compressed condition.

8. The invention as set forth in claim 7 including stop means for contacting the shank and preventing the shank from rocking upwardly beyond a preselected, fully tripped position wherein the trip level is greater than or equal to the initial trip level when the shank is in the soil-working position.

9. The invention as set forth in claim 7 wherein when the shank is in the fully tripped position, the coil spring is substantially fully compressed, and the pivotal connections are approximately aligned, with the third pivotal axis located between the first and second pivotal axis.

10. The invention as set forth in claim 7 wherein horizontal rearward force, acting against the tool-receiving end, required to rock the shank against the bias of the coil spring as the shank moves from the soil-working to the fully tripped position increases from an initial trip level to a maximum trip level at an intermediate trip position and thereafter diminishes to approximately the initial trip level as the shank moves toward the fully tripped position.

11. The invention as set forth in claim 10 wherein the ratio of the maximum level to the initial level is in a range between 1.4 to 1 and 2 to 1.

12. The invention as set forth in claim 10 or 11 wherein the initial trip level is greater than about eight hundred pounds.

13. The invention as set forth in claim 7 wherein the tension means includes an elongated member having a bolt-receiving rearward end, and bolt means threaded into said rearward end and acting against the U-shaped bracket for preventing the latter from moving beyond a preselected radial distance from said rearwardly-facing, spring-abutting surface.

14. The invention as set forth in claim 13 wherein the bolt means has a sufficient threaded length for permitting unthreading of said bolt means to permit expansion of the coil spring to its free length during assembly and disassembly of the spring trip standard assembly.

15. The invention as set forth in claim 14 further comprising spacer means selectively insertable between the rearward end and a portion of said bolt means for adjusting the soil-working position.

16. In a tillage implement having a frame with a support element and adapted for forward movement over the ground, a heavy duty spring trip standard assembly comprising: a rearwardly opening channel-shaped bracket connected to the support element and having a lower section extending below the support element and an upper section extending rearwardly and upwardly from the element; a shank having a forward end, a generally horizontal portion extending rearwardly from the forward end, and an intermediate portion curved downwardly from the horizontal portion and terminating in a lower tool-receiving end; means pivotally connecting the forward end of the shank to the lower bracket end between the sides of the channel-shaped bracket for permitting the shank to rock about a first transverse pivotal axis between a lower soil-working position and an upward fully tripped position; an upright bracket member connected to and for rocking with the shank, said upright bracket extending above the intermediate portion to an upper pivot-receiving portion defining a second transverse pivotal axis; a U-shaped bracket having leg portions connected to the upright bracket member for rocking about said second axis, said leg portions of the U-shaped member extending rearwardly from said second pivotal axis to a forwardly-facing, spring-abutting surface; spring-retaining structure including a rearwardly-facing, spring-abutting surface; means pivotally connecting said spring-retaining structure to the upper section between the sides of the channel-shaped bracket for rocking about a third transverse pivotal axis located rearwardly of and above the first pivotal axis; a single coil spring compressed between the forwardly- and rearwardly-facing, spring-abutting surfaces having a substantial portion extending rearwardly of the second axis for biasing the shank toward the soil-working position, wherein said spring-retaining structure includes tension means extending axially through the spring for retaining the spring in a compressed condition of approximately half the difference between the free length and the solid length of the spring and preventing the shank from rocking below the soil-working position, said tension means including rod-like structure having a dimension transverse to the axis of the coil-spring substantially equal to the inner diameter of the spring for maintaining alignment of spring between the spring-abutting surfaces, and wherein when the shank is in the fully tripped position, the coil spring is substantially fully compressed, with the third pivotal axis located above a line joining the first and second pivotal axes.

17. The invention as set forth in claim 16 wherein horizontal rearward force, acting against the tool-receiving end, required to rock the shank against the bias of the coil spring as the shank moves from the soil-working to the fully tripped position increases from an initial trip level to a maximum trip level at an intermediate trip position and thereafter diminishes to a level equal to or greater than the initial trip level as the shank moves toward the fully tripped position.

18. The invention as set forth in claim 17 wherein the initial trip force is greater than eight hundred pounds, and the ratio of the maximum level to the initial level is in a range between 1.4 to 1 and 2 to 1.

19. In a tillage implement having a frame adapted for forward movement over a field, a heavy duty spring trip shank assembly comprising: a mounting bracket adapted for connecting to the frame; a shank having a forward end and extending rearwardly from the forward end to an intermediate portion, said shank extending downwardly from the intermediate portion to a lower tool-receiving end; first pivot means connecting the forward end of the shank to the mounting bracket for permitting the shank to rock thereabout in generally a vertical plane between a lower soil-working position and an upper tripped position; an upright bracket connected for rocking with the shank and extending upwardly from the intermediate portion of the shank; a spring support bracket connected to the upright bracket for rocking about a transverse axis rearwardly and above the first pivot means, said spring support including a forwardly-directed, spring-abutting surface extending rearwardly of said transverse axis, wherein the spring support bracket comprises a U-shaped member including sidelegs pivotally connected to and extending rearwardly from the upright bracket, and the forwardly-directed, spring-abutting surface defines the bight portion of the U-shaped member rearwardly of the pivotal connection of said member with said upright member; spring-retaining means including a rearwardly-directed, spring-abutting surface, second pivot means connecting the spring-retaining means to the mounting bracket rearwardly of and above the first pivot means and forwardly of said transverse axis, wherein the distance between the spring-abutting surfaces decreases as the shank rocks upwardly from the soil-working position and wherein the distance between the forwardly directed, spring-abutting surface and the transverse axis is at least approximately one-third the distance between the spring-abutting surfaces when the shank is in the soil-working position; a single coil spring compressed between the spring-abutting surfaces and biasing the shank to the soil-working position; wherein said coil spring acts through a first effective moment arm which decreases as the shank rocks upwardly from the soil-working position, and wherein rearward forces against the tool-receiving end act through a second effective moment arm to rock the shank against the bias of the coil spring, said second effective moment arm changing as the shank rocks, wherein said first and second moment arms and said coil spring cooperate to establish a trip force curve characterized by a high initial rearward trip force level of greater than approximately eight hundred pounds whereat the shank begins to rock upwardly from the soil-working position, said trip force level increasing to a maximum level of between approximately 1.4 and two times said initial trip force level as the shank rocks upwardly to an intermediate position and thereafter decreasing as the shank rocks upwardly beyond the intermediate position to a maximum tripped position wherein the first and second pivot means and the tranverse axis are approximately aligned but offset below an overcenter position, and wherein at the maximum tripped position of the shank a substantial portion of the spring is contained between the transverse axis and the forwardly directed spring-abutting surface and the trip force level is substantially less than the maximum level but substantially greater than zero.

20. The invention as set forth in claim 19 wherein the initial trip force is greater than one thousand pounds and the maximum level is less than two thousand pounds.

21. The invention as set forth in claim 19 wherein the ratio of the maximum level to the initial level is approximately 1.5 to 1.

22. In a tillage implement having a frame adapted for forward movement over a field, a heavy duty spring trip shank assembly comprising: a mounting bracket adapted for connecting to the frame; a shank having a forward end and extending rearwardly from the forward end to an intermediate portion, said shank extending downwardly from the intermediate portion to a lower tool-receiving end; first pivot means connecting the forward end of the shank to the mounting bracket for permitting the shank to rock thereabout in generally a vertical plane between a lower soil-working position and an upper tripped position; support structure connected for rocking with the shank extending upwardly from the shank, said structure including an upright member fixed to the shank, a U-shaped member including sidelegs pivotally connected to and extending rearwardly from the upright member, and having a forwardly-directed, spring-abutting surface defining the bight portion of the U-shaped member rearwardly of the pivotal connection of said member with said upright member; spring-retaining means including a rearwardly-directed, spring-abutting surface, second pivot means connecting the spring-retaining means to the mounting bracket rearwardly of and above the first pivot means, wherein when the shank is in the soil-working position the pivotal connection of the U-shaped member is located between a first horizontal plane passing through the first pivot means and a second horizontal plane passing through the second pivot means and the distance between the spring-abutting surfaces decreases as the shank rocks upwardly from the soil-working position; a single coil spring compressed between the spring-abutting surfaces and biasing the shank to the soil-working position; wherein said coil spring acts through a first effective moment arm which decreases as the shank rocks upwardly from the soil-working position, and wherein rearward forces against the tool-receiving end act through a second effective moment arm to rock the shank against the bias of the coil spring, said second effective moment arm changing as the shank rocks, wherein said first and second moment arms and said coil spring cooperate to establish a trip force curve characterized by a high initial rearward trip force level whereat the shank begins to rock upwardly from the soil-working position, said trip force level increasing to a maximum level less than approximately twice said initial trip force level as ths shank rocks upwardly to an intermediate position and thereafter decreasing as the shank rocks upwardly beyond the intermediate position to a maximum tripped position, wherein at the maximum tripped position of the shank at least one-third of the spring extends rearwardly of said pivotal connection of the U-shaped member and the trip force level is about equal to said initial trip force level.

* * * * *

UNITED STATES PATENT AND TRADEMARK OFFICE
CERTIFICATE OF CORRECTION

PATENT NO. : 4,463,813

DATED : 7 August 1984

INVENTOR(S) : John D. Long and Phillip E. Stevens

It is certified that error appears in the above-identified patent and that said Letters Patent is hereby corrected as shown below:

```
Column 2, line 4, change "expensive" to -- expansive --;
Column 6, line 1, change "a" to -- α --;
Column 7, line 52, change "4" to -- 1 --;
Column 8, line 28, change "potions" to -- portions --; and
Column 12, line 30, change "ths" to -- the --.
```

Signed and Sealed this

Sixteenth Day of April 1985

[SEAL]

Attest:

DONALD J. QUIGG

Attesting Officer

Acting Commissioner of Patents and Trademarks